April 9, 1935.    W. E. JENSEN ET AL    1,996,812
PARTITION OR CELL CASE MACHINE
Filed April 8, 1933    10 Sheets-Sheet 9

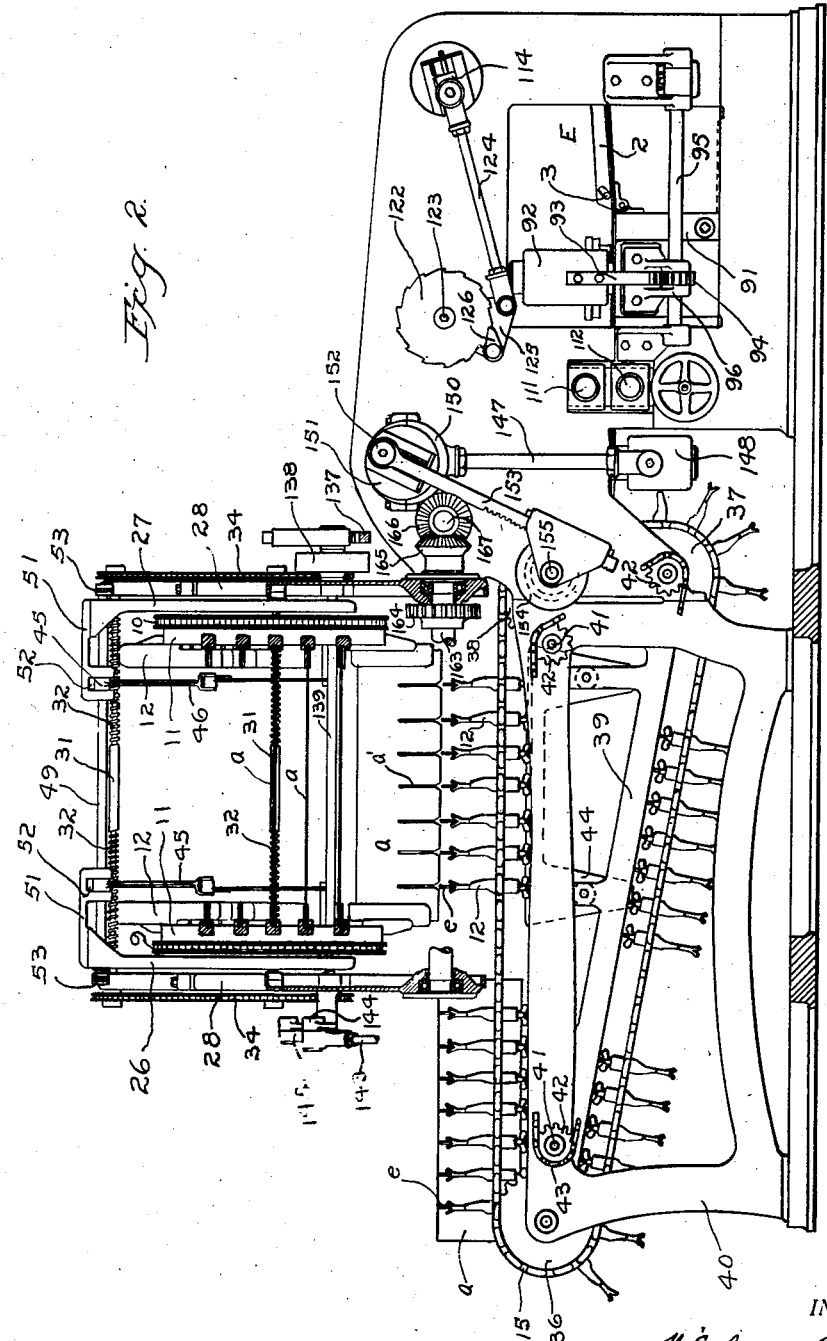

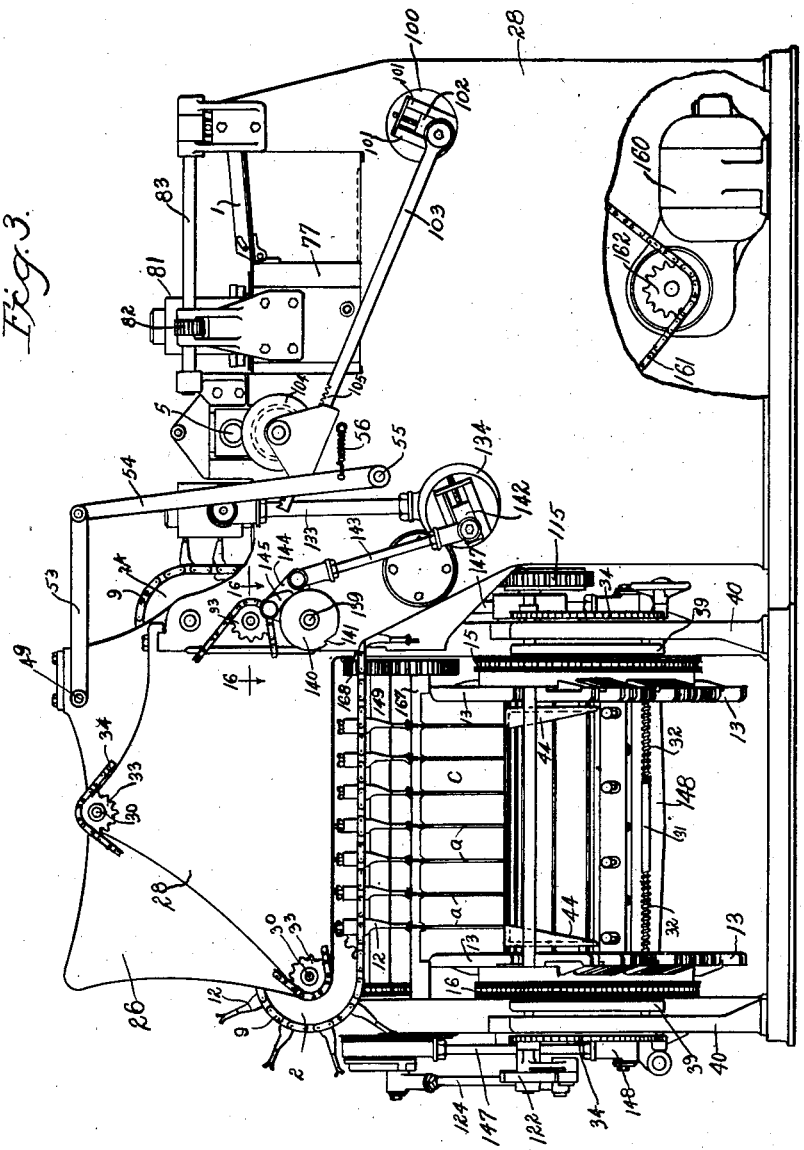

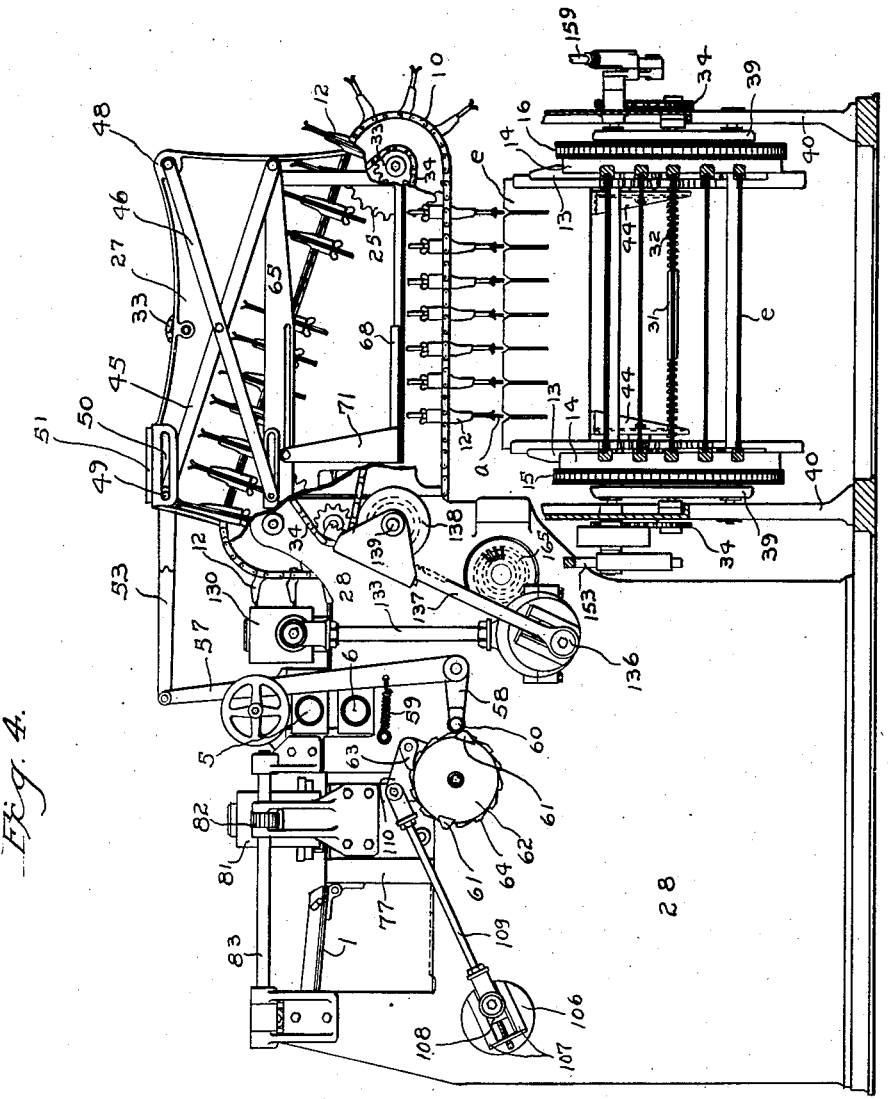

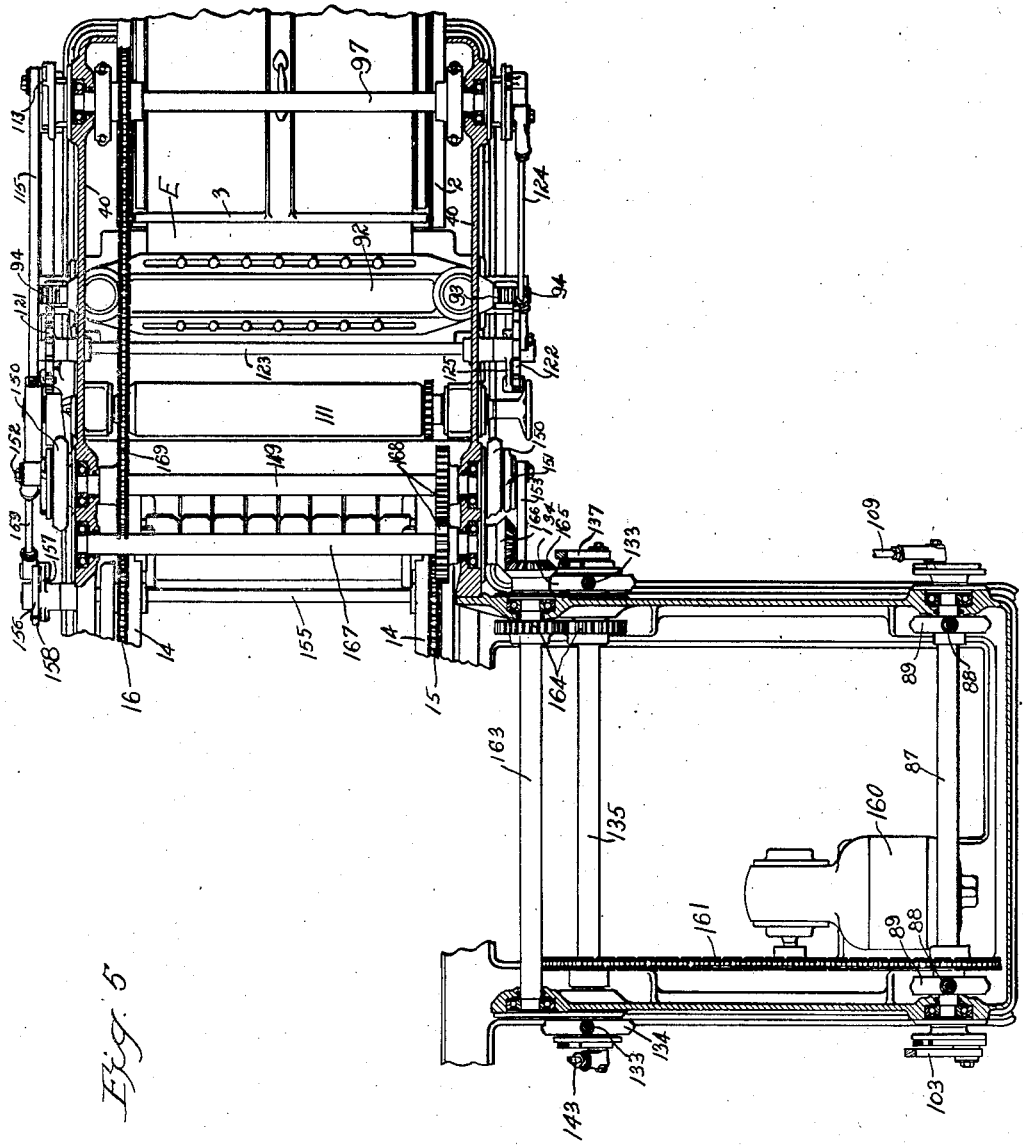

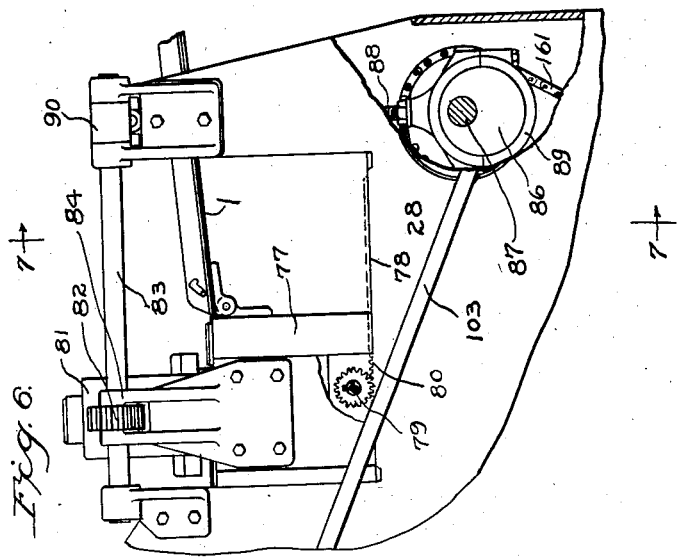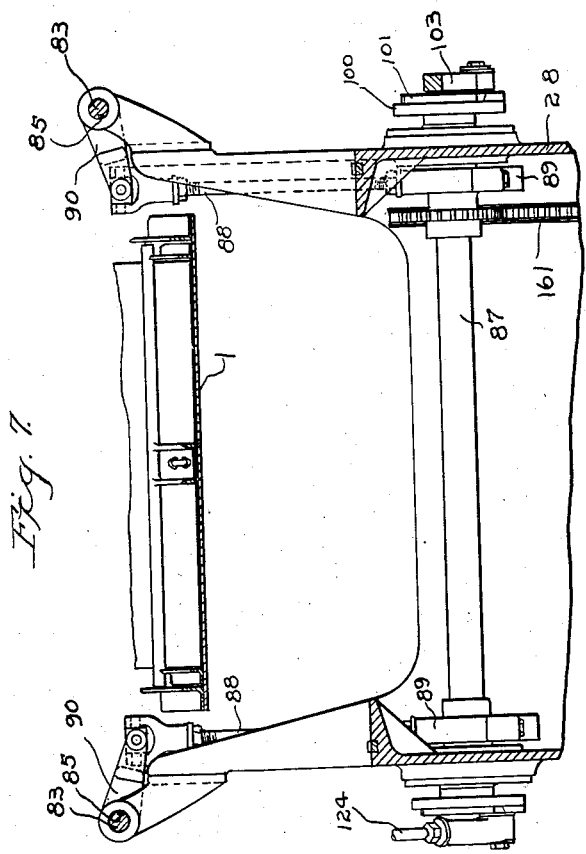

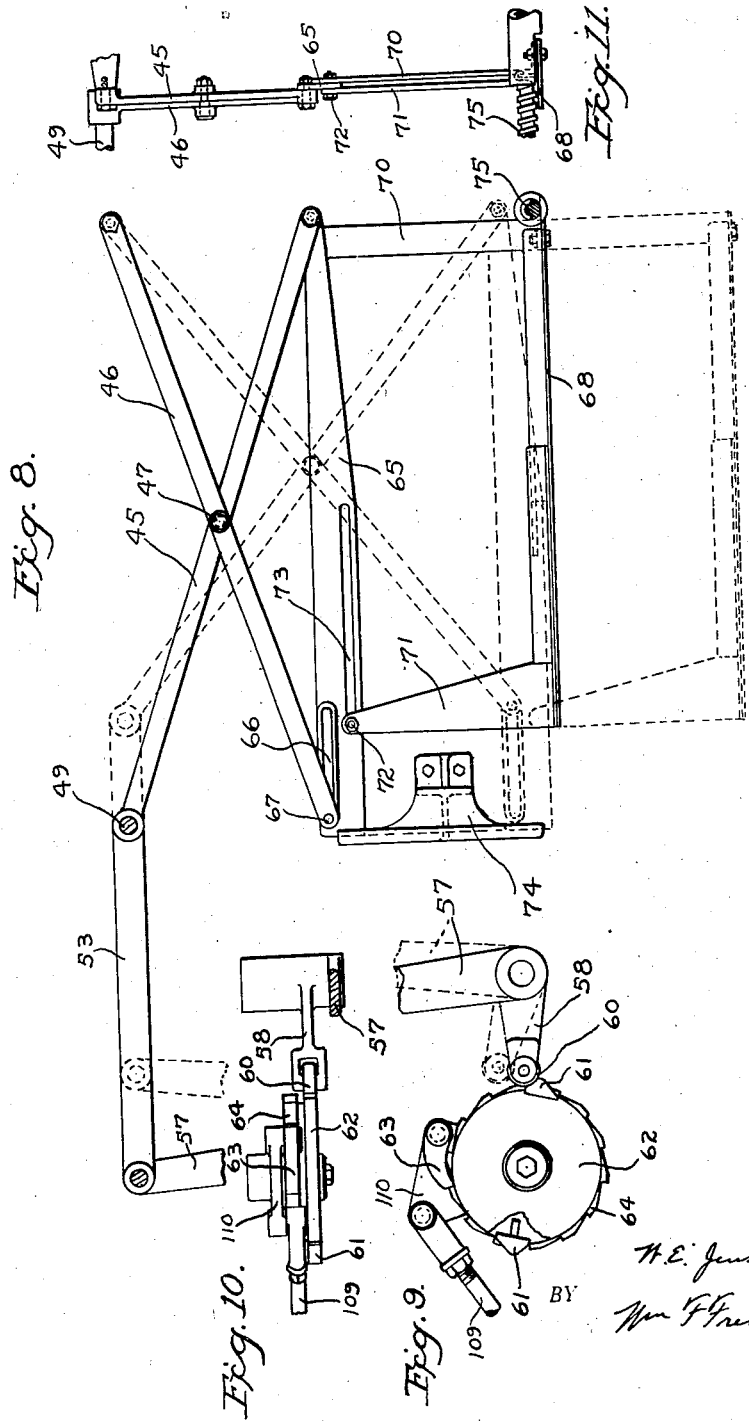

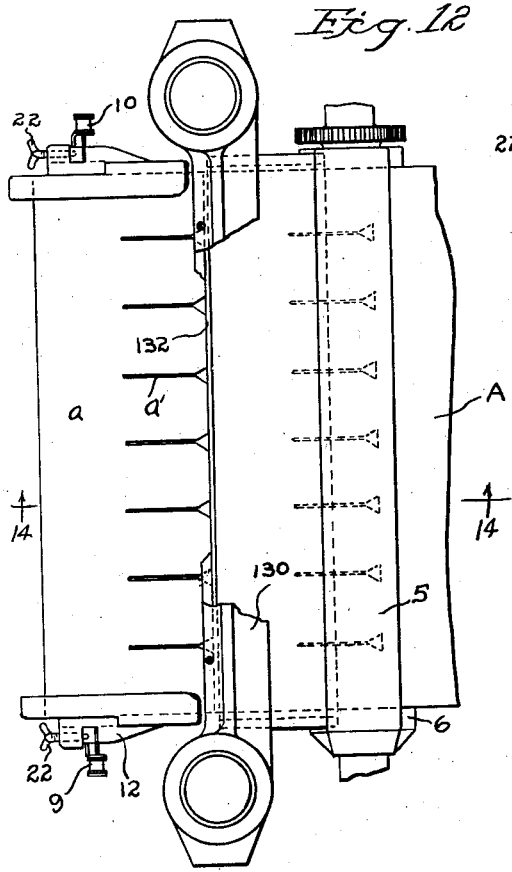
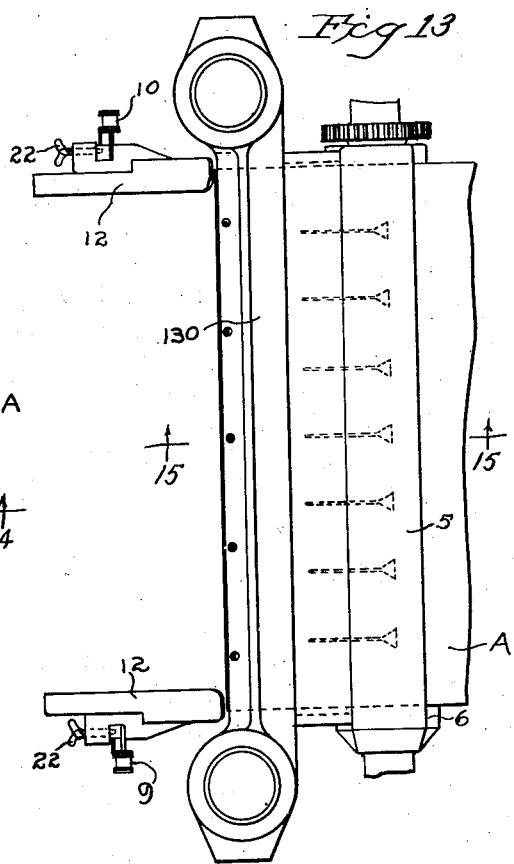
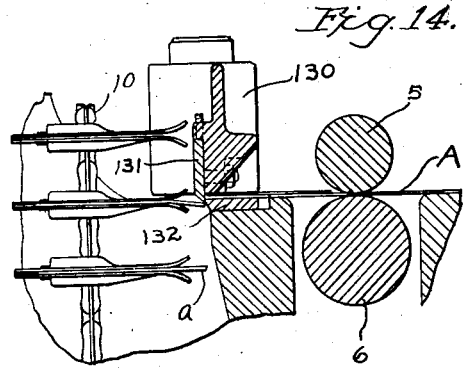
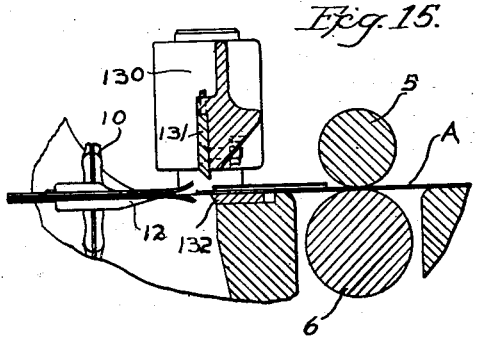

INVENTORS:
W. E. Jensen, W. R. Vail
BY Wm. F. Freudenreich,
ATTORNEY.

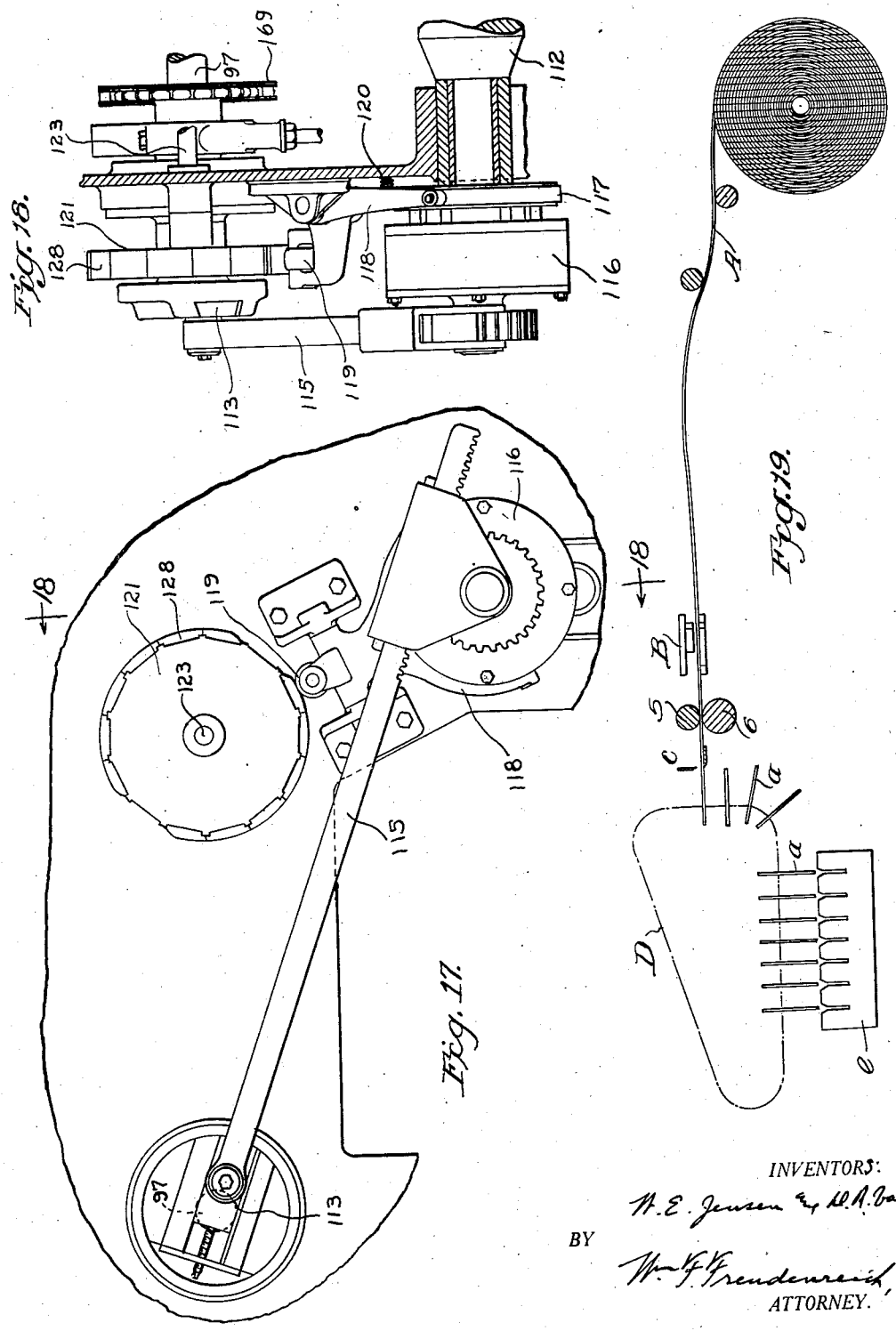

Patented Apr. 9, 1935

1,996,812

UNITED STATES PATENT OFFICE 1,996,812

PARTITION OR CELL CASE MACHINE

Walter E. Jensen and Daniel R. Vail, Chicago, Ill.

Application April 8, 1933, Serial No. 665,154

13 Claims. (Cl. 93—37)

The object of the present invention is to produce a simple and novel machine for manufacturing cell cases in which the number of strips in each set may vary in number, spacing and height or width.

Viewed in one of its aspects, the present invention may be said to have for its object to produce a simple and novel machine for manufacturing cell cases in which the strips may be made very wide or high, if desired.

Viewed in another of its aspects, the present invention may be said to have for its object to produce a simple and novel machine for manufacturing cell cases of various sizes from stiff, board-like material.

Figure 1:
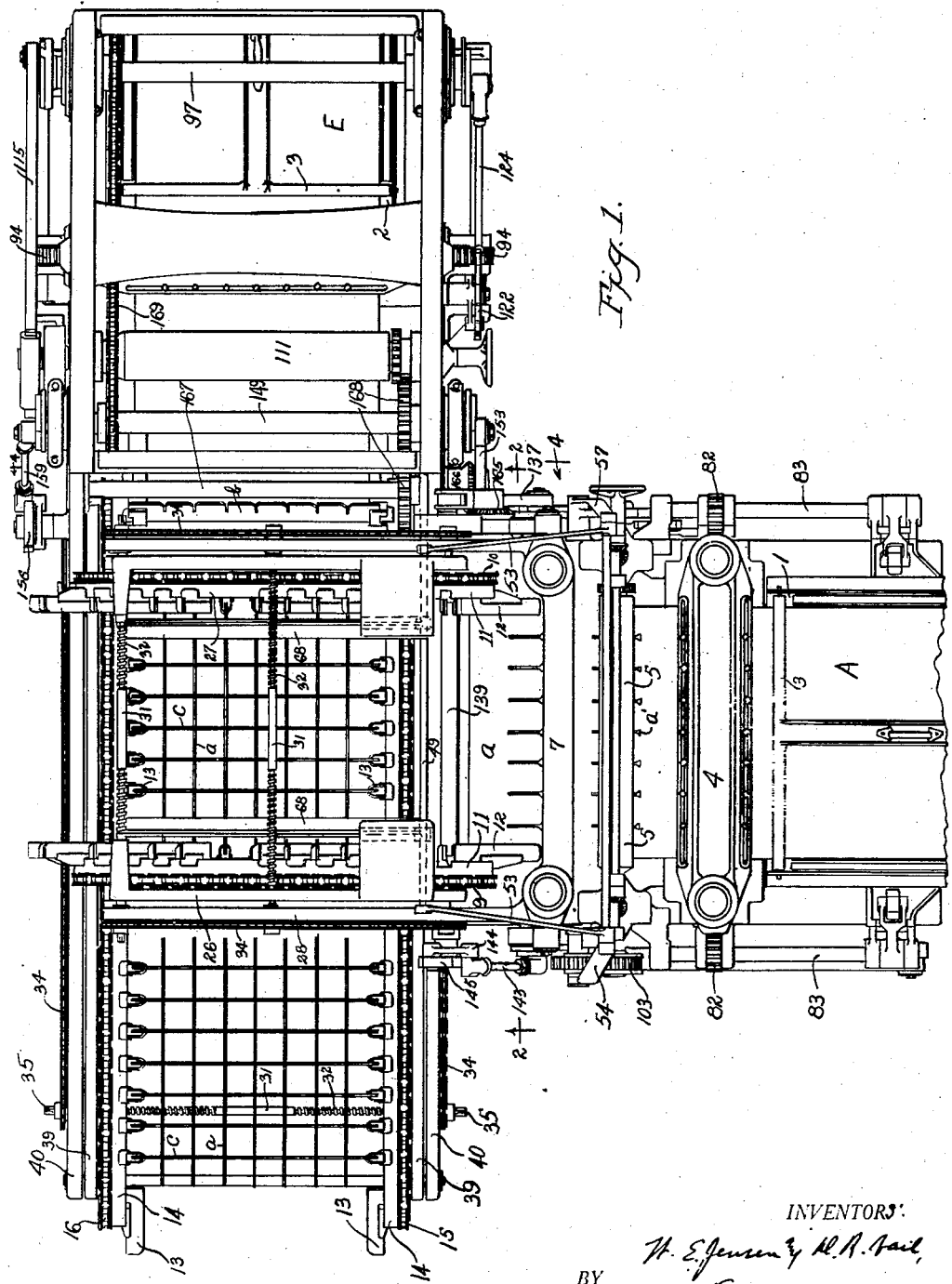
Figure 16:
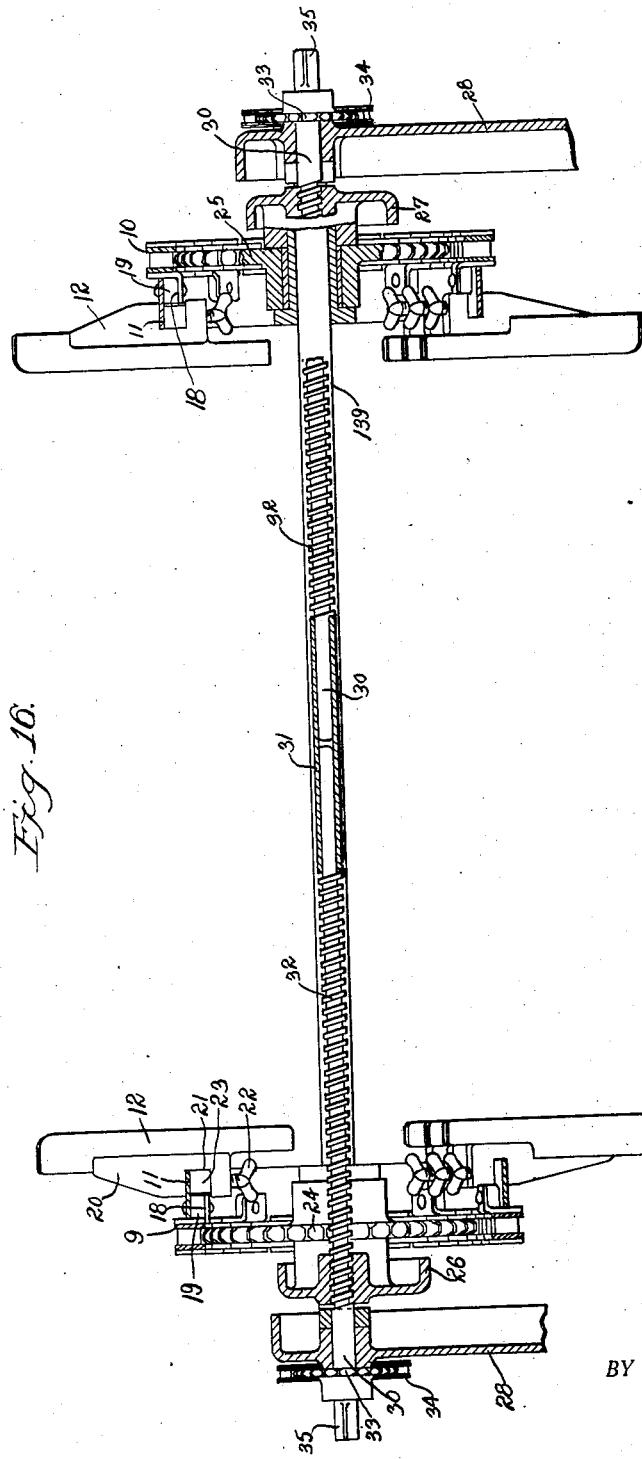

The various features of novelty whereby our invention is characterized will hereinafter be pointed out with particularity in the claims; but, for a full understanding of the invention and of its objects and advantages, reference may be had to the following detailed description taken in connection with the accompanying drawings, wherein:

Figure 1 is a top plan view of a machine embodying the present invention, one end being broken away; Fig. 2 is a section taken approximately on line 2—2 of Fig. 1; Fig. 3 is an elevation, looking at the machine from the left thereof as it appears in Fig. 1, a fragment of the frame being broken away to disclose the motor concealed within the base of the machine; Fig. 4 is a section taken approximately on line 4—4 of Fig. 1; Fig. 5 is a horizontal section through the machine as a whole, showing only a portion thereof; Fig. 6 is a view on a somewhat larger scale showing the same parts as appear in what may be termed the upper right-hand corner of Fig. 3, fragments of the frame or casing being broken away to expose parts that are concealed by the same; Fig. 7 is a section on line 7—7 of Fig. 6; Fig. 8 is an elevation of the pusher devices that force one set of strips down into interlocking relation with the cooperating set, two extreme positions being indicated in full and dotted lines, respectively; Fig. 9 is a view of the lower end of the actuating lever, the upper end of which appears in Fig. 8, together with the immediate operating means for the lever; Fig. 10 is a plan view of the parts shown in Fig. 9, the lever being in section; Fig. 11 is an end or edge view of the parts appearing in Fig. 8, showing them in the positions in which they appear in full lines in Fig. 8; Figs. 12 and 13 are plan views of a fragment of the machine showing a pair of holders for a partition, shear means and feed rolls, the paper stock having been fed into the holders in Fig. 12 but not yet having reached the holders in Fig. 13; Fig. 14 is a section on line 14—14 of Fig. 12; Fig. 15 is a section on line 15—15 of Fig. 13; Fig. 16 is a section taken approximately on line 16—16 of Fig. 3, but on a larger scale than Fig. 3, and showing only a fragment of the machine; Fig. 17 is a view, on a somewhat larger scale, showing the opposite side of the machine from that which appears in Fig. 2, only a fragment of what appears as the right-hand end of the machine in Fig. 2 being shown; Fig. 18 is a section on line 18—18 of Fig. 17, although all of the parts are shown in elevation except the frame and the bearing for the feed roll; and Fig. 19 is a diagrammatic view illustrating the operation of the machine.

The operation of the improved machine is illustrated diagrammatically in Fig. 19. A sheet A is unwound from a roll and progressively fed through suitable punching means B as is now commonly done. From the punching means the sheet is fed to a suitable cutting or shearing mechanism C that cuts strips a, extending across the entire width of the sheet, from the end of the sheet. These strips are pushed into individual holders distributed along a movable endless carrier D, the lower run of which is horizontal and of sufficient length to support the maximum number of strips or partitions that are required to form one set or group. A similar arrangement of mechanisms or means operates on a sheet traveling in a direction at right angles to the sheet A and cuts it up into strips or partitions 4 supported on an endless carrier or conveyor positioned below and whose upper run is horizontal and arranged at right angles to the lower run of the carrier D. Both sets or groups of mechanisms are so timed that, whenever the upper carrier presents a set of strips or partitions in the position of the group shown on the lower run of the carrier in Fig. 19, the other carrier also presents a complete set or group of strips or partitions standing on edge directly below but extending crosswise of the overlying set. Suitable means are provided for pushing the upper set down into interlocking relation with the lower set. The machine as a whole is so constructed that adjustments may be quickly and easily made to provide for any desired length of strips, spacings between the strips of either set and the heights or widths of the strips, and to produce the proper sequence of operations irrespective of the number of strips in a set.

The actual machine, viewed in plan, is T-shaped. Above the free end of the stem of the T is a suitable flat table 1 across which the sheet A is adapted to be fed. At the free end of one arm of the T is a second table 2 over which the second sheet E is adapted to be fed; the table 1, as shown in Fig. 3, being at a much higher level than is the table 2, as best shown in Fig. 2. Referring to Fig. 1 of the drawings, it will be seen that the sheet A passes underneath a small roller 3 extending across the table and thence underneath a punch head 4 that punches slots or notches a' in the sheet. The punched sheet passes between feed rollers 5 and 6, of which only the upper roller is visible, and thence underneath a vertically-reciprocable cutting or shearing head 7 that cuts the strips a from the end of the sheet. The endless carrier to which reference has been made is shown as being composed of two endless chains 9 and 10 along each of which extends a continuous flexible metal band 11. These bands are on the inner sides of the chains. Attached to each metal band is a series of holders 12; corresponding holders in the two sets or series being directly opposite each other. The parts are operated in such a manner that, whenever the end of the sheet is being fed ahead through the cutting mechanism, a pair of the holders will be in position to receive that portion of the sheet that has passed the shearing mechanism; so that, at the time a strip is severed from the sheet, it is already being supported in a pair of holders which are then carried ahead so as to place the next, empty, pair of holders in position to receive the next succeeding strip. The endless carriers for the strips a extend entirely across the cross member of the T. Still referring to Fig. 1, it will be seen that the paper or cardboard sheet E from which the strips e are cut passes under a small roller 3 similar to that above the table 1 and thence through suitable punching mechanism, feed rolls and shearing mechanism, until, finally, it is cut into strips or partitions e that are carried away in holders 13, 13 similar to the holders 12. The holders 13, 13 are secured to endless metal bands 14, 14 extending along and carried by endless sprocket chains 15 and 16, similar to the chains 9 and 10; the upper runs of the chains 15 and 16 being horizontal and extending underneath the chains 9 and 10 to the opposite end of the arm of the T from that at which the table 2 is positioned.

One of the important features of the invention is the endless carriers. The details of construction of these endless carriers are perhaps best shown in Figs. 12–16. Referring to these figures, it will be seen that at least some of the links of each of the chains have laterally-projecting lips 18 on the inner sides of these chains. The endless metal bands overlie these ears and are riveted thereto. If desired, spacers 19 may be placed between the bands and the ears. The holders consist of blocks 20 in one side of each of which is a notch 21 adapted to receive the band on the chain which is to carry the holder. A suitable thumb screw 22, carried by the block, clamps the block to the band. The holder proper may be in the form of a piece of sheet metal folded on itself to provide a long, deep, very narrow trough into which a marginal portion of a strip may be inserted; the sides of the trough gripping the strip and holding it against accidental displacement after the strip has once entered the holder. In the arrangement shown, the thumb screws 22 do not engage directly with the bands but with loose blocks 23 that have bearing faces of large area in contact with the bands. By loosening the thumb screw of a holder, the latter is released from the band and may either be removed therefrom or be slid lengthwise into any desired position. It is therefore a simple matter to adjust the holders on either set of endless carriers in such a manner as to provide any desired spacing between the holders and, therefore, the strips that are supported by the holders.

The distance between corresponding holders on either pair of endless carriers is the same as the length of the strips to be received thereby. Therefore, when it is desired to provide longer or shorter strips, it is necessary to adjust corresponding holders from and toward each other. The chains of each pair engage with and travel around sprocket wheels by means of which they are driven as well as supported. These sprocket wheels are rotatably mounted upon movable frame elements. Thus, in Fig. 16 we have shown two corresponding sprocket wheels 24 and 25. These are rotatably mounted upon vertical plates or frame members 26 and 27 respectively. These plates or frame members lie on the inner sides of stationary side plates or members 28, 28 on the main frame. Extending transversely across the machine, from one side frame member 28 to the other, are a plurality of rotatable shafts 30 each divided into two sections meeting within a long sleeve 31 slipped over the same. These shafts extend through the movable frame members or plates 26 and 27 and are screw-threaded, as indicated at 32, from points near the stationary side walls of the main frame to the ends of the sleeve 31. Consequently, these screw shafts being held in the stationary frame members in such a manner that they may rotate but cannot move lengthwise, any rotation of the corresponding sections of the screw shafts will cause the movable frame member through which they pass to move away from or toward the corresponding stationary side wall, depending upon the direction of rotation of the screw shafts. Each screw shaft has on the ends thereof, outside of the main frame, sprocket wheels 33. A suitable sprocket chain 34 extends around all of the sprocket wheels 33 on the same side of the machine so that, whenever any one of the shaft sections is turned, all of the other corresponding sections must likewise be turned. For the purpose of turning these screw shafts, each may have on the extreme outer end a part 35 adapted to receive a suitable crank or handle.

In Fig. 16 the movable frame members 26 and 27 are shown as being spread apart as far as they will go. The distance between corresponding holders on the endless carriers at this time determines the maximum length of the strips that may be handled. When the strips are to be shorter, the walls 26 and 27 are simply moved relatively to each other so as to bring them closer together, thereby bringing the two endless carriers closer to each other. It will be seen that the endless carriers may be brought very near each other, so that the distance between corresponding holders on the two carriers is quite short. Consequently, the carriers may be adjusted to handle very short strips or strips of any greater length up to the maximum determined by the width of the frame of the machine.

Without going into great detail, it may be noted that each of the sprocket chains 15 and 16 extends around and is engaged with and supported by sprocket wheels 36, 37 and 38; these sprocket wheels being in turn rotatably supported on vertical movable plates or frames 39, 39, similar to the frame members 26 and 27 heretofore described, and lying inwardly of and beside vertical side wall members 48, 48 of the main stationary frame. The movable frame members 39, 39 are supported on three screw shafts 41, 41 that are similar in all respects to the shafts 30, including the sleeve 31 into which the meeting ends of the two sections of each shaft extend, and the screw-threaded parts 32. On each end of each of these screw shafts is a sprocket wheel 42. A sprocket chain 43 extends around the three sprocket wheels 42 so that corresponding sections of the three screw shafts may be turned in unison. Fixed to the inner side of each of the movable frame members 39 is a bracket 44 having a long, flat horizontal upper face of some width; the upper faces of these brackets being adapted to form supports or rests for a set of the strips e when the latter are in the position to be engaged with a cooperating set, as in Figs. 2 and 3. In other words, the brackets serve to hold the lower set of strips up while the upper set is being pushed down into interlocking relation therewith.

The immediate means for pushing down an upper set of strips are best shown in Figs. 2, 4 and 8–11. Referring to these figures, it will be seen that there is hung from each of the movable frame members 26 and 27 a lazy tong arrangement from which depends a presser foot. Each lazy tong device consists of two bars 45 and 46 crossing each other and pivotally connected together at the middle, as indicated at 47. The upper end of the bar 46 is pivoted to the upper rear corner of the corresponding side frame 26 or 27, as the case may be, as indicated at 48. The upper end of the bar 45 is journalled on a transverse shaft 49 which, as best shown in Fig. 4, slides in a horizontal slot 50 in each of two brackets 51 at the upper front corners of the movable frame members 26 and 27. The arms 45 are loose on the shaft 49 so as to be rotatable relatively thereto, and be capable of moving lengthwise thereof. The upper ends of the arms 45 are engaged in jaws 52 in the brackets 51, so that as the movable walls or frame members 26 and 27 move from or toward each other, the arms 45 move along with them, as do also the arms 46 that are pivotally connected to the rear ends of the movable frame members. The shaft 49 is connected at each end to a forwardly-extending horizontal link 53. One of these links is pivotally connected to the upper end of an upright rocker arm 54 (see Fig. 3) pivotally connected at its lower end to the side wall 28 of the main frame, as indicated at 55. A tension spring 56 connected at one end to the arm 54 and at the other end to the frame member 28, tends constantly to hold the arm in such position that the shaft 49 is drawn to the forward limit of its movement, as illustrated in Fig. 4 and in Fig. 8. The other link 53 is connected to the upper end of an arm 57 similar to the arm 54 but forming the long arm of a bell crank lever whose short arm 58 extends forwardly outside of the main frame. A spring 59 acts on the arm 57, in the same way that the spring 56 acts on the arm 54. On the free end of the arm 58 of the bell crank lever is a cam roller 60 adapted to be engaged by a lug 61 on a rotatable member 62, at a predetermined point in the rotation of that member, so as to cause the bell crank lever to swing in the clockwise direction, as viewed in Figs. 4, 8 and 9, and thus cause the lazy tongs to assume the positioned illustrated in dotted lines in Fig. 8.

The member 62 is shown as having two of the lugs 61, diametrically opposed to each other, so that the lazy tongs will be actuated twice during each revolution of the member 62. The machine is shown as having been adjusted to make cell cases having seven strips in each set and, therefore, the member 62 is driven by a pawl 63 acting on a ratchet wheel 64 rotatable with the member 62 and having fourteen teeth. As will hereinafter be explained, the pawl 63 is driven in such time relation to the rest of the moving parts that while the strip carriers are moving ahead six steps the ratchet wheel 64 turns through an angular length equal to six of the ratchet teeth. Then, during the pause before the next step, one of the lugs 61 acts on the bell crank lever and operates the bell crank lever.

The shoe means carried by the lazy tongs are as follows: A horizontal bar 63 is pivoted at one end to the lower end of each of the bars 45 and has near its other end a longitudinal slot 66 through which extends a bolt 67 on the lower end of the corresponding bar 46. As the lazy tongs are opened and closed the bar moves down and up, respectively. The shoes which actually engage the strips to push them down are angle irons 68 hung from the bar 65. Each angle bar is shown as consisting of two sections slidable on each other to permit the bar to be lengthened and shortened at will. One end of each angle bar is hung from the corresponding bar 65 by a link 70, whereas the other end of the angle bar has fixed thereto, and rising therefrom, an arm 71 which is connected to the corresponding bar 65 by a bolt 72 passing through this arm and through a long slot 73 extending longitudinally of the bar 65. By loosening the nut on the bolt 72, the arm 71 may be slid along the bar 65 and thereby adjust the length of the angle iron shoe. One end of each of the bars 65 may be engaged with vertical guides on a bracket 74 fastened to the inner side of the corresponding movable frame member 26 or 27, to hold the pusher mechanism against swaying. The shoe devices may be connected together by a screw shaft 75, as best shown in Figs. 8 and 11, to brace one shoe device from the other; the screw shaft being preferably placed at the opposite end from that at which the guide brackets 74 are located.

The punching means for punching the slots or notches in the sheets may be of any usual or suitable type. Referring first to the punch B that is adapted to operate on a sheet A, it will be seen that it is mounted on a suitable base or carriage 77 to which the receiving table t is attached. The carriage 77 slides lengthwise of the stem of the T along suitable horizontal supporting faces 78. On the carriage is a pinion 79 that meshes with a rack 80 fixed to the main frame. Upon turning the pinion, the carriage with its punch mechanism may be adjusted to provide any desired spacing between the same and the corresponding cut-off mechanism or shearing means C and permit strips of any desired height to be severed from the sheet A. As best shown in Figs. 6 and 7, the plunger 81 of the punch is moved up and down by a pinion 82 rotatable with a horizontal shaft 83 extending parallel with the direction of travel of the sheet A and rotatable in suitable bearings in the main frame of the machine. In fact, there are two of the pinions 82 and two of the shafts; one on each side of the punch head. Each of these pinions lies between two arms of a bracket 84 fixed to the punch head carriage, so that the pinions travel with the punch head when the latter is adjusted. In order to compel the pinions 82 to rotate with their shafts, they are keyed to the shafts, each shaft having a keyway 85 extending lengthwise thereof. When the shafts 83 are oscillated the pinions thereon cooperate with suitable racks, not shown, on the punch plunger and cause the latter to move up and down. The oscillation of the shafts 83 is effected by means of eccentrics 86 on a transverse horizontal shaft 87 within what may be termed the base of the machine below the punch head. Rods 88 extend upwardly from suitable eccentric straps 89, to arms 90 fixed to and projecting radially from the shafts 83. The other punching mechanism is like that which I have just described, excepting that it is placed differently. As shown in Fig. 2, the punching mechanism for the sheet E is mounted on a slidable carriage 91 that is movable lengthwise of the cross arms of the T; the table 2 being supported by this carriage. The punch plunger 92 has on each side thereof a vertical rack bar 93 meshing with a pinion 94 rotatable with but slidable along a horizontal shaft 95. In each case, the pinion is mounted between two arms of a bracket 96 so that it must travel with the carriage. The two shafts 95 are oscillated in the same manner as is the other punch head, by eccentrics and eccentric rods, associated with a shaft 97.

The feed rolls 5 and 6, for the sheet A, are driven from the shaft 87. On one end of this shaft, as best shown in Fig. 3, is a disk 100 having thereon a pair of separated parallel guides 101 lying on opposite sides of the center. Between these guides and adjustable along the same, is a block 102 to which one end of a rod 103 is pivoted. The rod 103 actuates a suitable clutch 104 on the lower feed roller 6. The clutch may be of any suitable type, the movable member of which is driven by ratchet teeth 105 on the rod 103, so as to turn the roller step by step; the length of each step depending upon the adjustment of the block 102 with respect to the axis of the shaft 87. On the other end of the shaft 87 is a disk 106 similar to the disk 100, the same being provided with guides 107 between which is arranged an adjustable block 108. A rod 109 extends from the block 108 to a swinging arm 110 on which the pawl 63, heretofore described, is mounted. Therefore the shaft 87 drives the punch mechanism, the feed rolls, and the pusher devices, in proper time relation to each other.

The feed rolls 111 and 112, for the sheet E, are driven from the shaft 97 in the same way that the feed rolls 5 and 6 are driven from the shaft 87. As will hereinafter be explained, there is a definite fixed cycle of operations for each punch, shearing mechanism and endless carrier, the cycles being the same for both groups of mechanisms. As has been seen, the feed rolls 5 and 6 always operate in definite time relation to this particular cycle. If the other set of feed rolls does likewise, the machine will operate successfully to produce cell cases in which there are the same number of strips in each set or group of strips. Thus, the cell cases illustrated in the drawings are composed of two sets each containing seven strips. By making the proper adjustments cell cases may be made having any other desired number of strips, as long as the number in one set or group is the same as that in the other. However, if it be desired to have more strips in one set or group than in the other, means must be provided to cause a lesser number of strips to be cut by one set of mechanisms than by the other. The machine being otherwise as has been described, the only way in which it can be caused to produce cell cases in which there are less strips in one group than in the other, is to control the feed of the rollers 111 and 112, whereby these rollers will feed the strip E less frequently than the strip A is fed by the other rollers. This can conveniently be accomplished by throwing out at predetermined intervals the clutch that drives the feed rolls 111 and 112, and this is the expedient that we have adopted, the same being best illustrated in Figs. 2, 17 and 18. Referring to these figures, it will be seen that the shaft 97 is equipped on both ends with what may be termed radially adjustable crank pin blocks, indicated at 113 and 114, respectively; these blocks corresponding to the blocks 102 and 108. Pivoted to the crank pin block 113 is a toothed rod 115 that drives the feed roller 112 through a suitable clutch 116. This clutch may be thrown out of action by a suitable controller 117. This controller is adapted to be actuated by a suitable rocker device pivoted on the main frame of the machine, one arm of the rocker device being in the form of a fork or yoke 118 that embraces the controller 117, and the other arm of the rocker device having thereon a roller 119 adapted to be engaged by a suitable clutch-tripping means. As will be seen in Fig. 18, there is between the yoke 118 and the frame of the machine a compression spring 120 that tends to hold the clutch controller in the clutch release position. The tripping device consists of a wheel 121 the periphery of which is so shaped that during a portion of each rotation of the wheel it engages with the roller 119 and causes the controller to be actuated in a direction to permit the clutch to operate; whereas, at other times, the wheel will be out of contact with the roller 119 and thus permit the spring 120 to throw the clutch out. Just as the shaft 87 drives the toothed wheel 64 step by step, so does the shaft 97 drive another toothed wheel 122. The wheels 121 and 122 are mounted on opposite ends of a transverse shaft 123. The toothed wheel 122, and therefore its shaft, is turned step by step through a connecting rod 124 pivoted at one end to the adjustable crank pin block 114 and at its other end to a swinging lever 125 that carries a pawl 126 engaged with the toothed wheel. As the shaft 97 rotates, the wheels 121 and 122 are driven in unison, step by step. Therefore, if the wheel 121 be provided on its periphery with blocks or insets or other removable or adjustable devices 128, equal in number and in spacing to the teeth on the ratchet wheel 122, it will be seen that the wheel 121, when at rest, will always present one of the block devices, or the like, in position to engage the roller 119, unless such a device has been removed or adjusted so that it will not engage with the roller. If all of the blocks or insets are in place, the clutch will remain in at all times but, if it be desired to interrupt the feed of the sheet E at times while the other sheet is being fed, it is only necessary to remove or adjust the proper number of blocks or insets on the wheel 121 so that whenever a gap in the circumferential row of blocks or insets comes opposite the roller 119, the clutch will be thrown out and the sheet E will not be fed until the gap has passed beyond the roller on the clutch-tripping device.

The shearing or cutting mechanisms for severing strips from the sheets A and E may be of any usual or suitable type. In the arrangement shown, the shearing means for the sheet A consists of a vertically-reciprocable head 130 provided with a long horizontal blade 131 set on edge and cooperating with a long stationary flat-lying blade 132. The head is moved up and down by vertical eccentric rods 133, on opposite sides of that part of the machine; these rods being connected to eccentric straps 134 on a transverse shaft 135 in the base of the machine. The shaft 135 serves also to drive the endless carrier D, composed of the chains 9 and 10. As best shown in Fig. 4, the shaft 135 has on one end a radially-adjustable crank pin 136 connected to a rack bar 137, similar to the bars or rods 103 and 115, which drives a suitable clutch 138 on the shaft 139 that drives corresponding sprocket wheels over which the chains 9 and 10 run. On the other end of the shaft 139, as best shown in Fig. 3, is a disk 140 having therein a notch 141. On the end of the shaft 135, on the same side of the machine as that on which the disk 140 is located, is a radially-adjustable crank pin block 142, similar to those heretofore described. A connecting rod 143 extends between the block 142 and an arm 144 capable of swinging about the axis of the shaft 139. On the arm 144 is a pawl 145. It will be seen that once during each revolution of the shaft 139 the notch 141 in the edge of the disk 140 is brought into position to be engaged by the pawl 145. Therefore, regardless of the number of steps that the shaft 139 makes to complete a revolution, or approximately a revolution, the pawl 145 will always bring it into a predetermined angular position at the end of a pre-determined number of strokes. The purpose of this is to permit groups of strips carried in the corresponding endless carriers or conveyors always to be brought exactly into the same positions from which they are pushed down into interlocking engagement with a set of strips in the lower carriers or conveyors, regardless of the length of time that the machine may run. If this rectifying arrangement were not employed, it would be practically impossible so to adjust the parts that one set of strips after another, for any considerable length of time, would always be brought accurately to rest in the assembly position, because any very slight variation in the length of a step which would prevent the length of one of the endless conveyors from being an exact multiple of that step, would soon result in bringing groups of strips ready to be assembled out of registration with the assembly position. With the rectifying device in operation, however, the positions of the conveyors or carriers will be corrected every time that the conveyors have traveled a few feet.

The cutting or shearing means for the sheet E is just like that heretofore described, except that it is placed in an inverted position; the operating rods 147 extending upwardly from the head 148, as best shown in Fig. 2, and causing the head to be moved down on a return stroke and upward on a working stroke. This cutting mechanism, together with the endless chains or conveyors 15 and 16, are driven from a transverse shaft 149 extending across the frame of the machine near the top of that portion through which the sheet E is fed preparatory to cutting it into strips and entering the strips in the holders of the lower pair of conveyors. As shown in Figs. 2 and 5, the shaft 149 has on each end an eccentric device including the eccentric straps 150 that are connected to the upper ends of the rods 147. On each end of the shaft 149, also, is a disk 151 having thereon a radially-adjustable crank pin 152.

One of these crank pins is connected to a toothed driving rod 153 that drives the lower conveyors through a clutch 154 on the shaft 155 that passes through corresponding conveyor sprocket wheels 38. The crank pin at the other end of the shaft 149 operates a rectifying device for insuring accurate registration of assembly positions of the lower conveyors with corresponding positions of the upper conveyors. In other words, fixed on one end of the shaft 155 is a disk 156 similar to the disk 140. Mounted on the shaft beside the disk, so as to be capable of swinging about the shaft, is an arm 157 similar to the arm 144. The arm 157 carries a pawl 158 that cooperates with the disk 156 to rectify the positions of the lower conveyors after each short length of travel of the latter.

We have heretofore described the various mechanisms without regard to the power means for actuating the same. Obviously, the several shafts that may be considered as the main shafts for individual groups of mechanisms may be driven in any suitable way. In the arrangement shown, as will be seen from Figs. 3 and 5, we have housed in the base of the machine in that end into which the sheet A is first fed, an electric motor 160. A sprocket chain 161 runs over a sprocket wheel 162 on the motor shaft or driven by the motor and thence up over sprocket wheels on the shafts 87 and 135. There is an idler shaft 163 journalled in the frame of the machine beside the shaft 135, and these two shafts are geared together, as indicated at 164. The shaft 163 has on one end a bevel gear 165 that meshes with a complementary gear 166 on an idler shaft 167 near and parallel to the shaft 149. Gearing 168 connects the shafts 167 and 149 together. A sprocket chain 169 extends over and around sprocket wheels on shafts 149 and 97, so that the shaft 97 is driven from the shaft 149. The shafts 87, 135, 97 and 149 drive all of the punching, feeding, cutting and conveying mechanisms, as well as the pusher mechanism that forces the upper sets or groups of strips down into interlocking engagement with the lower sets whenever both an upper set and a lower set are in their assembly position.

It is believed that the operation of the machine has been sufficiently explained in connection with the description of the construction of the machine. The purpose of making the various crank pins or crank pin blocks radially-adjustable is, of course, to permit variations in the lengths of the strokes of the elements or members driven thereby. The strokes of the shears and punches need not be varied, and therefore these elements may be driven by means of eccentrics. However, the feed of the two sets of feed rolls must be varied whenever it is desired to change the height of the cell cases to be produced, and the driving means for the endless carriers must be adjusted whenever the spacings of the strips or partitions are to be changed. It is evident that, if each step of the step by step movement of one pair of conveyors is short, dimension of the cells corresponding to that step will also be short. With the arrangement illustrated, either transverse dimension of the cells in a cell case may be varied within wide limits by simply adjusting the stroke of the driving means for the endless carriers that determine that dimension. Since the timing of the punches and the cutters does not vary as long as the motor is running at a constant speed, it is necessary that the punch heads be moved from and toward the corresponding feed rolls whenever the height of the cell cases is to be increased or decreased. With the arrangement shown, we are able to make cell cases that are low or shallow or cases that are a foot high.

The holders on the endless carriers must, of course, be spaced apart lengthwise of the carriers distances corresponding to the lengths of the steps through which the carriers are fed. This is conveniently accomplished by simply loosening the holders and sliding them along the flexible metal bands which constitute the actual supports therefor on the carriers. Not only can the heights of the cell cases and the transverse dimensions of their cells be varied within wide limits, but the over-all transverse dimensions may also be changed by making the strips longer or shorter. This is made possible by the mounting of the two chain units of each carrier, that permits these units to be brought fairly close together or be drawn apart to almost the full width of the machine.

We are able to make not only cell cases in which there are the same number of strips in each group or set, but cell cases in which there are more strips in one set than in the other. This can be done because of the presence of the simple throwout device which periodically renders idle one set of feed rolls and therefore causes a lesser number of strips to be severed from the sheet fed by those feed rolls than are being formed out of the other sheet during the same period of time.

It would be very difficult to make provision for producing structures in which the cells may have any transverse dimensions within limits comparatively far apart, without making rather extensive substitutions or replacements of parts, if it were not for the means that we have provided for rectifying the positions of the conveyors after every two or three feet of travel. As a matter of fact, the rectification or compensating action preferably takes place whenever a conveyor has traveled a distance that is as great as the widest or longest cell case within the capacity of the machine. With this arrangement, when the largest cell cases are being made, each separate group will be properly registered; whereas, when the cell cases on which work is being done are so small that a plurality of them can be set up in the same section of a carrier that will be occupied by a cell case of the largest size, the error in registration will never be so great as to prevent proper assembling of complementary sets or groups of strips.

It should be noted that because of the ruggedness and simplicity of our machine we are able to handle stiff, heavy, board-like stock and thus produce cell cases that are very strong and rugged as distinguished from cell cases made of comparatively light, flexible material as are now commonly made.

While we have illustrated and described with particularity only a single preferred form of our invention, we do not desire to be limited to the exact structural details thus illustrated and described; but intend to cover all forms and arrangements which come within the definitions of the invention constituting the appended claims.

We claim:

1. In a cell case machine, crossed conveyors, holders on each conveyor to receive the ends of the strips that are to be assembled into cell cases, said holders being arranged in pairs each of which is adapted to engage the opposite ends of a strip, means to adjust the holders of each pair from and toward each other, mechanism to deliver strips into the holders on both conveyors, mechanism to force a group of strips carried by one conveyor out of the holders and into interlocking relation to a group of strips on the other conveyor, and means to operate the conveyors and the said mechanisms in definite time relation to each other.

2. In a cell case machine, crossed conveyors, holders on each conveyor to receive the ends of the strips that are to be assembled into cell cases, said holders being arranged in pairs each of which is adapted to engage the opposite ends of a strip, means simultaneously to adjust the holders to vary the distance between the holders of each pair, mechanism to deliver strips into the holders on both conveyors, mechanism to force a group of strips carried by one conveyor out of the holders and into interlocking relation to a group of strips on the other conveyor, and means to operate the conveyors and the said mechanisms in definite time relation to each other.

3. In a cell case machine, crossed conveyors, holders on each conveyor to receive the ends of the strips that are to be assembled into cell cases, said holders being arranged in pairs each of which is adapted to engage the opposite ends of a strip; means to adjust the holders of each pair from and toward each other; mechanism to feed and punch sheets and cut them into strips and then insert the strips into the holders on both conveyors; mechanism to force a group of strips carried by one conveyor out of the holders and into interlocking relation to a group of strips on the other conveyor; and means to operate the conveyors and the said mechanisms in definite time relation to each other.

4. In a cell case machine, crossed conveyors, holders on each conveyor to receive the ends of the strips that are to be assembled into cell cases, said holders being arranged in pairs each of which is adapted to engage the opposite ends of a strip, means to adjust the holders of each pair from and toward each other, mechanism to transform two sheets into strips and deliver the strips into the holders on both conveyors, mechanism to force a group of strips carried by one conveyor out of the holders and into interlocking relation to a group of strips on the other conveyor, and means to operate the conveyors and the said mechanisms in definite time relation to each other.

5. In a cell case machine, crossed conveyors, holders on each conveyor to receive the ends of the strips that are to be assembled into cell cases, said holders being arranged in pairs each of which is adapted to engage the opposite ends of a strip, means to permit the adjustment of the pairs of holders on each conveyor from and toward each other, means to adjust the holders of each pair from and toward each other, mechanism to deliver strips into the holders on both conveyors, mechanism to force a group of strips carried by one conveyor out of the holders and into interlocking relation to a group of strips on the other conveyor, and means to operate the conveyors and the said mechanisms in definite time relation to each other.

6. In a cell case machine, endless conveyors arranged one above the other and crossing each other, holders on the conveyors for strips to be assembled into cell cases, adjustable means to move the conveyors step by step through steps of any desired length over a wide range, means automatically to rectify the position of each conveyor at intervals so that given points on the conveyor will always come to rest at given stationary points regardless of whether or not the length of a conveyor will divide equally by the length of a step, means to deliver strips into said holders, and means to drive groups of strips on one conveyor into interlocking relation to groups of strips on the other conveyor.

7. In a cell case machine, two endless conveyors arranged one above the other and crossing each other, holders on the conveyors for strips to be assembled into cell cases, punching means and shearing means for each of two sheets to be formed into strips, means to operate the conveyors step by step, feeding means for each sheet adapted to advance the sheet by steps whose time intervals are of the same length as the intervals between the step by step movements of the conveyors, and means adapted to cause one of said feeding means periodically to remain idle while the other feeding means continues to operate.

8. In a cell case machine, two endless conveyors arranged one above the other and crossing each other, holders on the conveyors for strips to be assembled into cell cases, punching means and shearing means for each of two sheets to be formed into strips, means to operate the conveyors step by step, two sets of feed rolls each adapted to feed one of the sheets, a driving means for each set of rolls for turning them step by step, and means for periodically rendering one of said driving means inoperative to drive its feed rolls while the other driving means continues to turn its rolls.

9. In a cell case machine, two endless conveyors arranged one above the other and crossing each other, holders on the conveyors for strips to be assembled into cell cases, punching means and shearing means for each of two sheets to be formed into strips, means to operate the conveyors step by step, two sets of feed rolls each adapted to feed one of the sheets, mechanisms each tending to feed one of the sheets uniformly step by step, and means controlling one of said mechanisms to cause it periodically to remain inoperative during the time required for one or more steps.

10. In a machine of the character described, a conveyor comprising two endless chains, a continuous flexible metal band secured to each chain on the side facing the other chain, holders clamped on said bands, and means to cut a sheet into strips and feed the strips into said holders.

11. In a machine of the character described, a conveyor comprising two endless chains, holders distributed along each chain, each holder being directly opposite the corresponding holder on the other chain, means to adjust the holders on the respective chains which support them and each holder including a work-gripping member in the form of two parallel plate-like elements spaced apart from each other to permit the end of a strip to be moved between the plate-like elements in the direction of the length of the latter.

12. In a machine of the character described, a conveyor comprising two endless chains, holders distributed along each chain, each holder being directly opposite the corresponding holder on the other chain, means to adjust the holders on the respective chains which support them and each holder including a work-gripping element in the form of a sheet of spring metal folded to produce two wings spaced apart a distance somewhat less than the thickness of a strip to be held by the holder.

13. In a machine of the character described, crossed conveyors each consisting of two parallel endless chains spaced apart from each other, holders on each chain in position to engage with the adjacent ends of strips extending between the same and the opposite chain and leave the main portions of the strips free, means to produce two sets of strips and set them in the conveyors, means to operate the conveyors to bring one set of strips directly above the other, a pusher device having bars extending crosswise of and above the strips of the upper set, and means to actuate said pusher device to push the strips of the upper set down into interlocking engagement with the strips of the other set.

WALTER E. JENSEN.
DANIEL R. VAIL.